US008413041B2

(12) United States Patent
Lee et al.

(10) Patent No.: US 8,413,041 B2
(45) Date of Patent: Apr. 2, 2013

(54) APPARATUS AND METHOD FOR PARSING XML DOCUMENT BY USING EXTERNAL XML VALIDATOR

(75) Inventors: Jae-shin Lee, Seoul (KR); Kyoung-hoon Yi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 2404 days.

(21) Appl. No.: 10/452,282

(22) Filed: Jun. 3, 2003

(65) Prior Publication Data
US 2004/0002952 A1    Jan. 1, 2004

(30) Foreign Application Priority Data

Jun. 26, 2002 (KR) ..................... 10-2002-0036066

(51) Int. Cl.
*G06F 17/00* (2006.01)
(52) U.S. Cl. .................... 715/234; 715/209; 715/255
(58) Field of Classification Search .............. 715/513, 715/514, 515, 530
See application file for complete search history.

(56) References Cited

U.S. PATENT DOCUMENTS

| | | | | |
|---|---|---|---|---|
| 6,476,828 B1* | 11/2002 | Burkett et al. | ............... | 715/760 |
| 6,636,845 B2* | 10/2003 | Chau et al. | ......................... | 707/1 |
| 6,643,633 B2* | 11/2003 | Chau et al. | ......................... | 707/1 |
| 6,658,625 B1 | 12/2003 | Allen | ............................ | 715/523 |
| 6,678,889 B1* | 1/2004 | Burkett et al. | ............... | 718/104 |
| 6,704,743 B1* | 3/2004 | Martin | ..................... | 707/103 R |
| 6,721,727 B2* | 4/2004 | Chau et al. | ......................... | 707/3 |
| 6,941,521 B2* | 9/2005 | Lin et al. | ....................... | 715/762 |
| 2002/0123993 A1* | 9/2002 | Chau et al. | ......................... | 707/5 |
| 2002/0133484 A1* | 9/2002 | Chau et al. | ......................... | 707/3 |
| 2002/0156772 A1* | 10/2002 | Chau et al. | ......................... | 707/3 |
| 2002/0165872 A1* | 11/2002 | Meltzer et al. | ............... | 707/500 |
| 2003/0014397 A1* | 1/2003 | Chau et al. | ......................... | 707/3 |
| 2003/0061216 A1* | 3/2003 | Moses | ............................ | 707/9 |
| 2003/0184585 A1* | 10/2003 | Lin et al. | ....................... | 345/763 |
| 2004/0261020 A1* | 12/2004 | Layman et al. | ............... | 715/513 |
| 2005/0166209 A1* | 7/2005 | Merrick et al. | ............... | 719/310 |

FOREIGN PATENT DOCUMENTS

| | | |
|---|---|---|
| JP | 07-192001 | 7/1995 |
| JP | 10-171810 | 6/1998 |
| JP | 2001-67348 | 3/2001 |
| JP | 2001-155016 | 6/2001 |
| JP | 2002-091299 | 3/2002 |
| JP | 2002-342316 | 11/2002 |

(Continued)

OTHER PUBLICATIONS

Salminen, Airi, et al.; Document Databases: Requirements for XML document Database Systems; Nov. 9-10, 2001; Proceedings of the 2001 ACM Symposiumon Document Engineering; pp. 85-94.*

(Continued)

*Primary Examiner* — Xuan Thai
*Assistant Examiner* — Nathan Hillery
(74) *Attorney, Agent, or Firm* — Sughrue Mion, PLLC

(57) ABSTRACT

Provided are an apparatus and a method for verifying the validity of an XML document when an XML application operates in an embedded device having a relatively low-performance processor and a small memory so as to prevent errors in the XML application due to wrong information. An XML parser using an external XML validator includes an XML receiver, an external XML validator caller, and a DOM/SAX tree generator. The external XML validator includes a schema/DTD receiver, an XML validator, and an XML validity result transmitter.

27 Claims, 5 Drawing Sheets

FOREIGN PATENT DOCUMENTS

| | | | |
|---|---|---|---|
| KR | 2002-0020400 A | | 3/2002 |
| KR | 2002-0023048 A | | 3/2002 |
| KR | 20020020400 A | * | 3/2002 |
| KR | 20020023048 A | * | 3/2002 |

OTHER PUBLICATIONS

Chuang, Tyng-Ruey; generic Validation of Structural Content with Parametric Modules; Sep. 3-5, 2001; ACM SIGPLAN Notices, Proceedings of the sixth ACM SIGPLAN international conference on Functional programming; vol. 36, Issue 10; pp. 98-109.*

Cingli, Ibrahim, et al.; Dynamic Modification of XML documents: external application invocation from XML; Jun. 2000; ACM SIGecom Exchanges; vol. 1, Issue 1; pp. 1-6.*

W3C, XHTML™ 1.0: The Extensible HyperText Markup Language; Jan. 26, 2000; W3C; Section 3.*

XML: Author—Elliotte Rusty Harold, pp. 177-182, 212-221, Partial translation/Abstract.

* cited by examiner

APPARATUS AND METHOD FOR PARSING XML DOCUMENT BY USING EXTERNAL XML VALIDATOR

This application claims the priority of Korean Patent Application No. 2002-36066, filed on Jun. 26, 2002, in the Korean Intellectual Property Office, the disclosure of which is incorporated herein in its entirety by reference.

BACKGROUND OF THE INVENTION

1. Field of the Invention

The present invention relates to an apparatus and a method for verifying the validity of an extensible markup language (XML) document, a well-known standard electronic document, by using a schema/document type definition (DTD) data structure describing a grammar of the XML document, and more particularly, to an apparatus and a method for solving the problem of a parser which cannot support the verification of the validity of an XML document using a general schema/DTD data structure in an embedded device having a relatively low-performance processor and a small memory due to restrictions regarding the specifications of the embedded device.

2. Description of the Related Art

In the prior art, an XML parser having a validator used to verify the validity of an XML document is written using an external entity, in an XML application using the XML document. The validator reads a schema/DTD from an external source, generates the structure of data on a grammar defined using the schema/DTD, and checks an error in the XML document using the defined grammar. However, the XML application operating in an embedded device, e.g., a personal digital assistant (PDA), a portable phone, or the like, has limitations in verifying the validity of the XML document. Most embedded systems support an XML parser that does not support the verification of the validity of an XML document or an XML parser, a portion of which is extended to verify only a limited schema or grammar of a DTD, in order to reduce load due to a process of verifying the XML document using a schema or a DTD. Due to this, a special validating parser is realized to perceive only a schema/DTD necessary for each system. Thus, the special validating parser cannot be used in other systems.

Also, if a schema/DTD publisher publishing a schema/DTD used as an external entity in an XML document realizes new grammar, an XML document, which uses an existing schema/DTD and has no errors, is not validated any more. Thus, the XML document using the schema/DTD published as the external entity has to be newly constituted with changes in a schema or grammar of a DTD.

SUMMARY OF THE INVENTION

The present invention provides an apparatus and a method for verifying the validity of an XML document used for describing information on an embedded device having a relatively low-performance processor and a small memory or standards for a business document when an XML application using the XML document operates in the embedded device.

According to an aspect of the present invention, there is provided an XML parser using an external XML validator. The XML parser includes an XML receiver, an external XML validator caller, and a DOM/SAX tree generator. The XML receiver receives an XML document from an XML application. The external XML validator caller requests the external XML validator to verify the validity of the XML document and receives an answer to the request. If the external XML validator caller receives an answer indicating that the XML document is valid, the DOM/SAX tree generator generates a DOM/SAX tree from the XML document and transmits the DOM/SAX tree to the XML application.

According to another aspect of the present invention, there is also provided an external XML validator for verifying the validity an XML document in an XML parser. The external XML validator includes a schema/DTD receiver, an XML validator, and an XML validity result transmitter. The schema/DTD receiver is requested to verify the validity of the XML document from the XML parser and receives a schema or a DTD corresponding to the XML document from a schema/DTD database. The XML validator applies the XML document to the received schema or the DTD to verify the validity of the XML document. The XML validity result transmitter transmits the validity result of the XML document to the XML parser.

BRIEF DESCRIPTION OF THE DRAWINGS

The above features and advantages of the present invention will become more apparent by describing in detail exemplary embodiments thereof with reference to the attached drawings in which.

DETAILED DESCRIPTION OF THE INVENTION

Hereinafter, preferred embodiments of the present invention will be described in detail with reference to the attached drawings.

Figure 1:
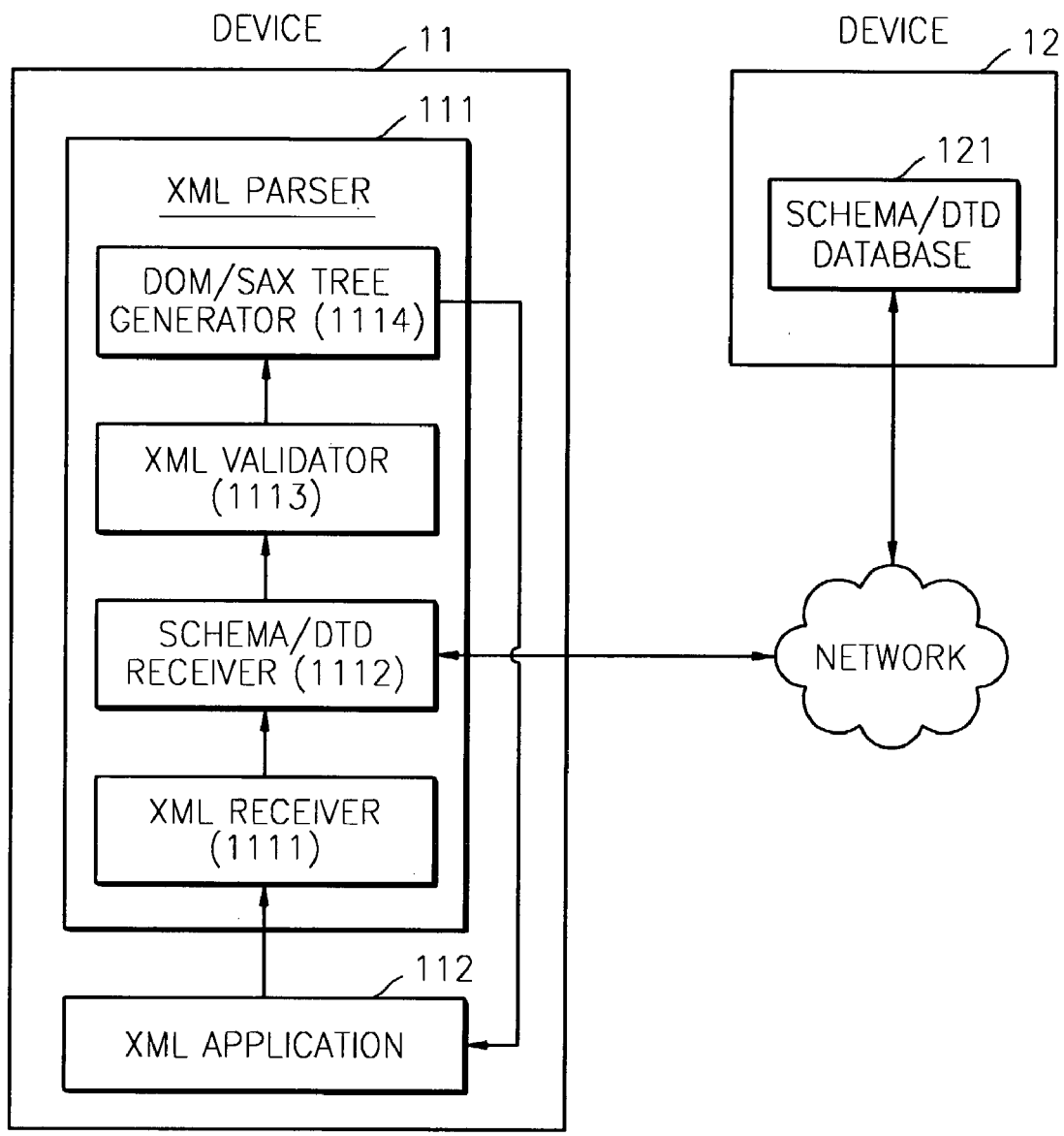
FIG. 1 is a view illustrating the configuration of a conventional XML parser.

FIG. 1 shows the configuration of a conventional XML parser.

Referring to FIG. 1, a device 11 includes an XML parser 111, an XML application 112, and other elements (a central processing unit (CPU), memory, and the like). A device 12 includes a schema/DTD database 121 and the other elements in the device 11. The XML parser 111 includes an XML receiver 1111, a schema/DTD receiver 1112, an XML validator 1113, and a document object model (DOM)/simple API for XML (SAX) tree generator 114. The other elements included in the device 11 and the device 12 are not necessary to illustrate principles of the present invention and thus are not shown in FIG. 1.

The XML application 112 generally refers to a space in which a user can work on an XML document using a variety of tools. The XML receiver 1111 receives the XML document from the XML application 112. The schema/DTD receiver 1112 receives schema/DTD data from the schema/DTD database 121 of the device 12. A DTD is a specification taking the form of a document instance (DI) and defines rules of a document, i.e., the rules for writing the DI. The DI of the XML document, which is an entity of the XML document, corresponds to the text written by a user under the rules defined in the DTD. Compared with elements of a programming language, the DTD is the definition of language. Thus, the DTD has to define the structure of an XML document and the DI has to be written according to the definition of the DTD to validate the XML document. The DTD is composed of an element, an attribute list (ATTLIST), and an entity. The element defines attributes of a plurality of elements including the highest element, i.e., a plurality of attributes. The entity is very similar to a macro used in some programming languages. The entity is classified into a general entity and a parameter entity according to definition and reference type. The general entity is defined in the DTD and referred to in the DI. The parameter entity is defined and referred to in the DTD. Besides these, the DTD includes a marked section and a processing instruction. The marked section is used to process a marked portion of a document for a special purpose, and the processing instruction is processed in the document by using an external program. In order to parse the DTD having the above-described structure, grammar of the DTD has to be inspected and the rules for a DI document have to be created by using information on the structure of the document. In a case where the structure of a document created in this process is generated using a Backus-Naur Form (BNF) input to a parser generator, errors and vagueness of grammar may occur. Thus, the rules for the DI document have to be checked in the tree form in order to exclude the errors and vagueness of grammar. An XML schema generally refers to a file, which defines the structure and contents of an XML document. The DTD is a kind of schema and can have many problems. The DTD describes the structure and contents of an XML document in complicated and unfamiliar language by using extended Backus-Naur Form (EBNF). However, the XML schema describes the structure and contents of an XML document using XML. Also, the XML schema can basically reuse a variety of types of data and elements the DTD cannot express. In other words, the XML schema, which is a largely extended model of a DTD, can define the types of elements the XML document can contain, relations among the elements, and a type available to each of the elements in detail.

If an XML document processed by the XML application 112 operating in the device 11 complies with the grammar defined in a schema/DTD stored in the schema/DTD database 121 of the device 12, the schema/DTD receiver 1112 receives a schema/DTD document from the device 12 via a wire or wireless communication network (generally a network) by employing a method used in an example of an XML document of the device 11 as shown below.

Example of an XML document of the device 11

```
<?xml version="1.0"?>
<Invoice xmlns="http://www.invoice.org"
    xmlns:xsi="http://www.w3.org/2000/10/XMLSchema-instance"
    xsi:schemaLocation="http://www.invoice.org/Invoice.xsd">
  <PaymentDue Currency="USD">199.00</PaymentDue>
</Invoice>
```

"xsi:schemaLocation="http://www.invoice.org/Invoice.xsd" is information on a uniform resource locator (URL) of the device 12 including the schema/DTD database 121. In other words, the XML parser 111 in the device 11 finds information on the location of the schema/DTD database 121 using the tag <schemaLocation>.

The XML validator 1113, which validates errors in the XML document, analyses a protocol, for configuring an XML document, defined in the schema/DTD and creates a schema/DTD grammar structure. Next, the XML validator 1113 applies the XML document to the schema/DTD grammar structure to validate errors in the XML document.

If it is determined that the XML document has no errors, the DOM/SAX tree generator 1114 generates a DOM/SAX tree and transmits the DOM/SAX tree to the XML application 112. A DOM represents a model which analyzes and stores parsed data in the tree structure, and allows an access to a specific element. The DOM uses the highest element of the XML document as a root node to analyze the XML document in a hierarchical tree structure. Since the DOM expresses data in the tree structure, the DOM is free to access a specific node. Thus, the DOM is also called a random access protocol. A SAX is similar and complementary to the DOM. In the DOM, as described above, all XML documents are parsed and converted to data structures having tree structures. This method is very flexible and efficient but uses many system resources. In particular, even when a specific field value of an XML document is required, the XML document has to be totally parsed, which may be a heavy burden. The SAX appeared to solve this problem. The SAX does not upload the whole of an XML document to a memory in the tree structure. However, the SAX sequentially parses elements, transfers the parsed elements to the memory, and omits to constitute the elements in the tree structure. The DOM is called a random access protocol while the SAX is called a serial access protocol. The SAX is also named an event-driven protocol by which an XML handler registers itself in a SAX parser and the SAX parser informs the XML handler through a call-back function of newly found XML tags.

Figure 2:
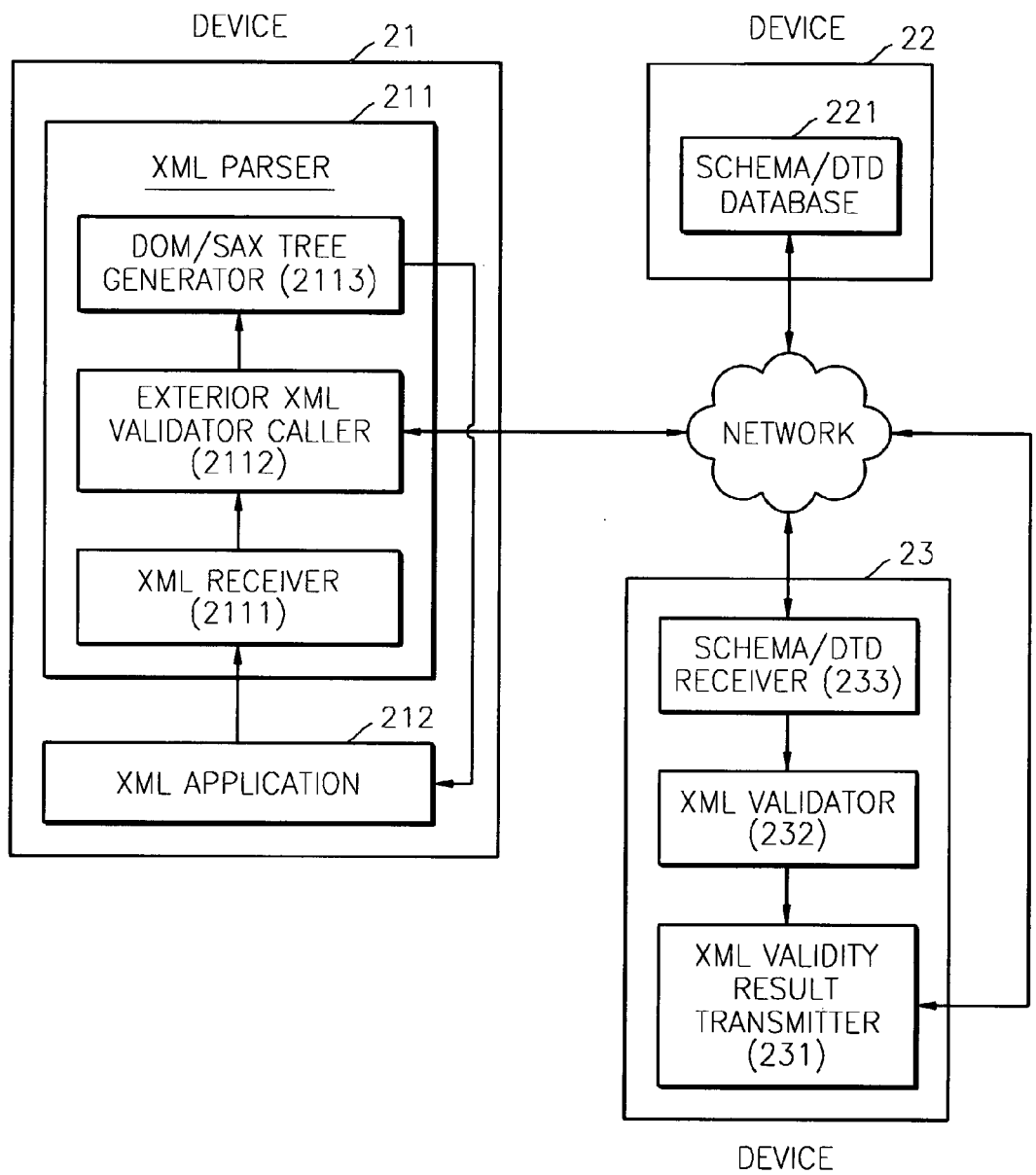
FIG. 2 is a view illustrating the configuration of an XML parser using an external XML validator according to an embodiment of the present invention.

FIG. 2 shows the configuration of an XML parser using an external XML validator according to an embodiment of the present invention. Referring to FIG. 2, a device 21 includes an XML parser 211 using the external XML validator, an XML application 212, and other elements (a CPU, memory, and so forth). A device 22 includes a schema/DTD database 221 and the other elements included in the device 21. A device 23, which the external XML validator, includes a schema/DTD receiver 233, an XML validator 232, and an XML validity result transmitter 231. The XML parser 211 includes an XML receiver 2111, an external XML validator caller 2112, and a DOM/SAX tree generator 2113.

The XML receiver 2111 receives an XML document from the XML application 212.

The external XML validator caller 2112 requests the XML validator 23 to verify the validity of the XML document and receives an answer to the request. Here, the external XML validator caller 2112 finds the location of the external XML validator 23 from the received XML document. In other words, the external XML validator caller 2112 calls the external XML validator 23 via a wire or wireless network by employing a method used in an example of an XML document of the device 21 as shown below.

Example of an XML document of the device 21

```
<?xml version="1.0"?>
<Invoice xmlns="http://www.invoice.org"
    xmlns:xsi="http://www.w3.org/2000/10/XMLSchema-instance"
    xsi:schemaLocation="http://www.invoice.org/Invoice.xsd"
xsi:validatorLocation="http://www.samsung.com/DeviceAnalyzer">
  <PaymentDue Currency="USD">199.00</PaymentDue>
</Invoice>
```

"xsi:validatorLocation="http://www.samsung.com/DeviceAnalyzer" is information on an URL of the external XML validator 23. In other words, the XML parser 211 in the device 21 finds the location of the external XML validator 23 using the tag <validatorLocation>.

When the external XML validator caller 2112 requests the external XML validator 23 to verify the validity of the XML document, the external XML validator caller 2112 transmits a version of the operating system (OS) of the device 21 having the XML parser 211 and the XML document to the external XML validator 23 in the URL thereof via the wire or wireless network.

If the external XML validator caller 2112 receives from the external XML validator 23 an answer indicating that the XML document is valid, the DOM/SAX tree generator 2113 generates a DOM/SAX tree from the XML document and transmits the DOM/SAX tree to the XML application 212. If the external XML validator caller 2112 receives from the external XML validator 23 an answer indicating that the XML document is not valid, the external XML validator caller 2112 transmits an error message to the XML application 212.

If the schema/DTD receiver 233 receives a request for the verification of the validity of the XML document from the XML parser 211, the schema/DTD receiver 233 receives a schema/DTD corresponding to the XML document from the schema/DTD database 221 via the wire or wireless network. In other words, after the schema/DTD receiver 233 receives the version of the OS of the device 21 having the XML parser 211 and the XML document and then the request for the verification of the validity of the XML document from the XML parser 211, when the OS requires the external XML validator 23, the schema/DTD receiver 233 receives the schema/DTD corresponding to the XML document from the schema/DTD database 221. However, if the device 21 having the XML parser 211 is not an embedded device (e.g., a PDA, a portable phone, or the like) having a relatively low-performance processor and a small memory, since the device 21 includes an apparatus for verifying the validity of the XML document, the device 21 does not require the external XML validator 23. In order to receive the schema/DTD corresponding to the XML document from the schema/DTD database 221, the schema/DTD receiver 233 should find the location of the schema/DTD database 221, i.e., the URL of the schema/DTD database 221, from the XML document. This is as follows: the schema/DTD receiver 233 receives the schema/DTD from the schema/DTD database 221 in the URL "xsi:schemaLocation=http://www.invoice.org/Invoice.xsd" descried in the example of the XML document of the device 21. In other words, the external XML validator 23 receives the XML document from the device 21, receives a corresponding schema/DTD in the tag <schemaLocation>, and verifies the validity of the XML document.

The XML validator 232 applies the XML document to the received schema/DTD to verify the validity of the XML document. In other words, the XML validator 232 analyses a protocol, for configuring an XML document, defined in the schema/DTD and generates a schema/DTD grammar structure. Next, the XML validator 232 applies the XML document to the schema/DTD grammar structure to validate errors in the XML document. Here, all possible XML documents can be validated by changing or modifying the version of the schema/DTD.

The XML validity result transmitter 231 transmits the validity result of the XML document to the XML parser 211 via the wire or wireless network. According to the validity result can, three cases appear. In the first case, the device 21 is not an embedded device having the relatively low-performance processor and small memory, and a "NONE" message is created and transmitted. In the second case, the XML document has no errors, and an "OK" message is created and transmitted. In the third case, the XML has errors, and a message containing "Error+line number+reason" is created and transmitted. In the case where the "OK" message is created and transmitted to the device 21, a DOM/SAX tree is created and transmitted to the XML application 212. In the case where the "NONE" message or the message "Error+line number+reason" is created and transmitted to the device 21, the "NONE" message or the message "Error+line number+reason" is itself transmitted to the XML application 212 via the wire or wireless network.

Figure 3:
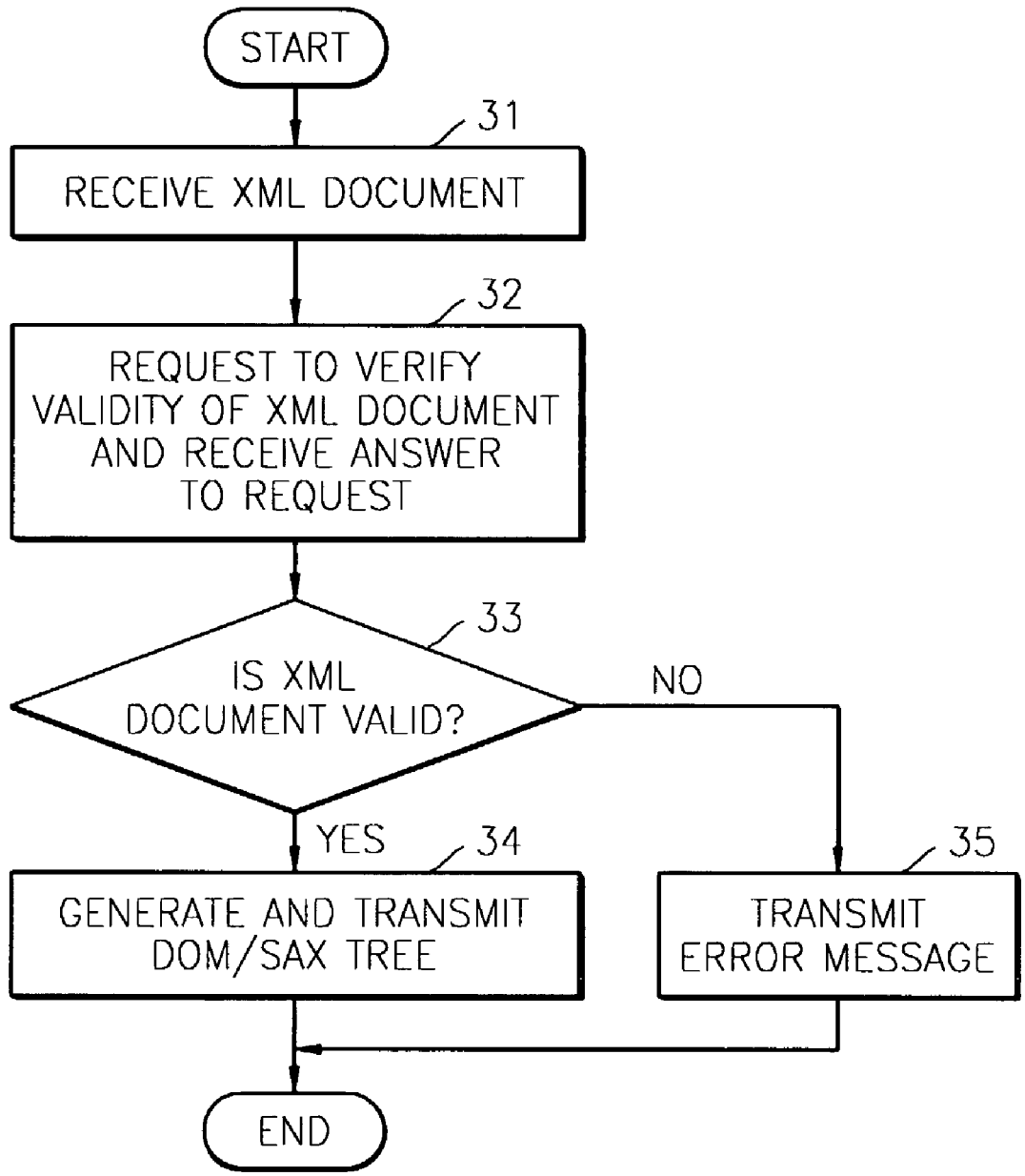
FIG. 3 is a flowchart explaining a method for parsing an XML document by using the external XML validator according to an embodiment of the present invention.

FIG. 3 is a flowchart for explaining a method for parsing an XML document by using an external XML validator according to an embodiment of the present invention.

In step 31, an XML document is received from an XML application. In step 32, the external XML validator receives a request for verifying the validity of the XML document and responds to the request. If in step 33, it is determined that the XML document is valid, a DOM/SAX tree is generated from the XML document and transmitted to the XML application via a wire or wireless network in step 34. If in step 33, it is determined that the XML document is not valid, in step 35, an error message is transmitted to the XML application via the wire or wireless network. For the request for the verification of the validity of the XML document, the location of the external XML validator should be found from the received XML document and then requested to verify the validity of the XML document. Also, when requesting to verify the validity of the XML document, a version of the OS of a device for performing the XML parsing method and the XML document are transmitted to the external XML validator.

Figure 4:
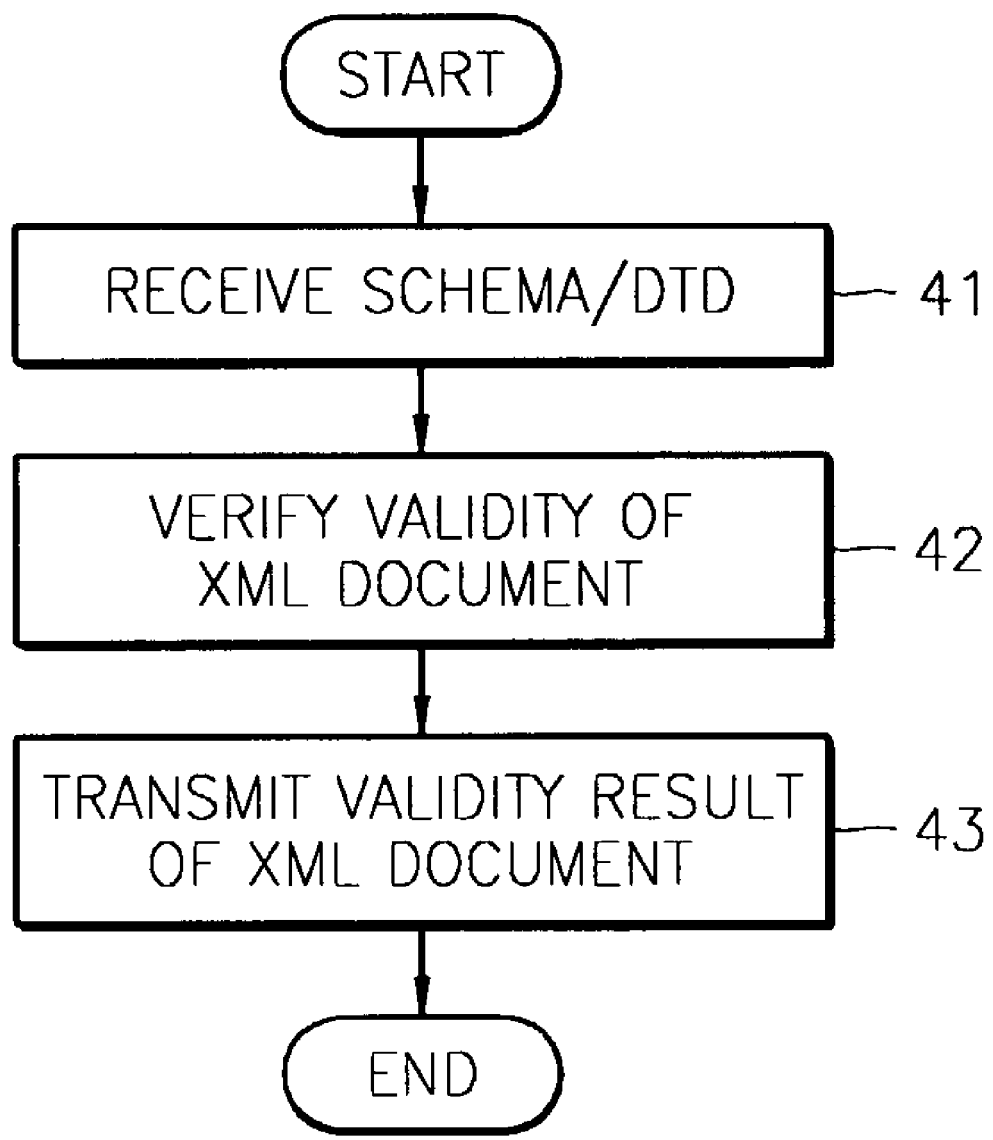
FIG. 4 is a flowchart explaining a method for verifying the validity of an XML document by using the external XML validator according to an embodiment of the present invention.

FIG. 4 is a flowchart for explaining a method for verifying the validity of an XML document by using an external XML validator according to an embodiment of the present invention.

In step 41, if a request for verifying the validity of an XML document is received from an XML parser using the external XML validator, a schema/DTD corresponding to the XML document is received from a schema/DTD database via a wire or wireless network. In step 42, the XML document is applied to the schema/DTD and the validity of the XML document is verified. In step 43, the validity of the XML document result is transmitted to the XML parser using the external XML validator via the wire or wireless network. Here, after a version of the OS of a device for performing the XML parsing method and the XML document, and the request for verifying the validity of the XML document are received, only when the OS requires the external XML validator is the schema/DTD corresponding to the XML document received from the schema/DTD database. If the request for verifying the validity of the XML document is received, the location of the schema/DTD database should be found from the XML document to receive the schema/DTD corresponding to the XML document from the schema/DTD database.

Figure 5:
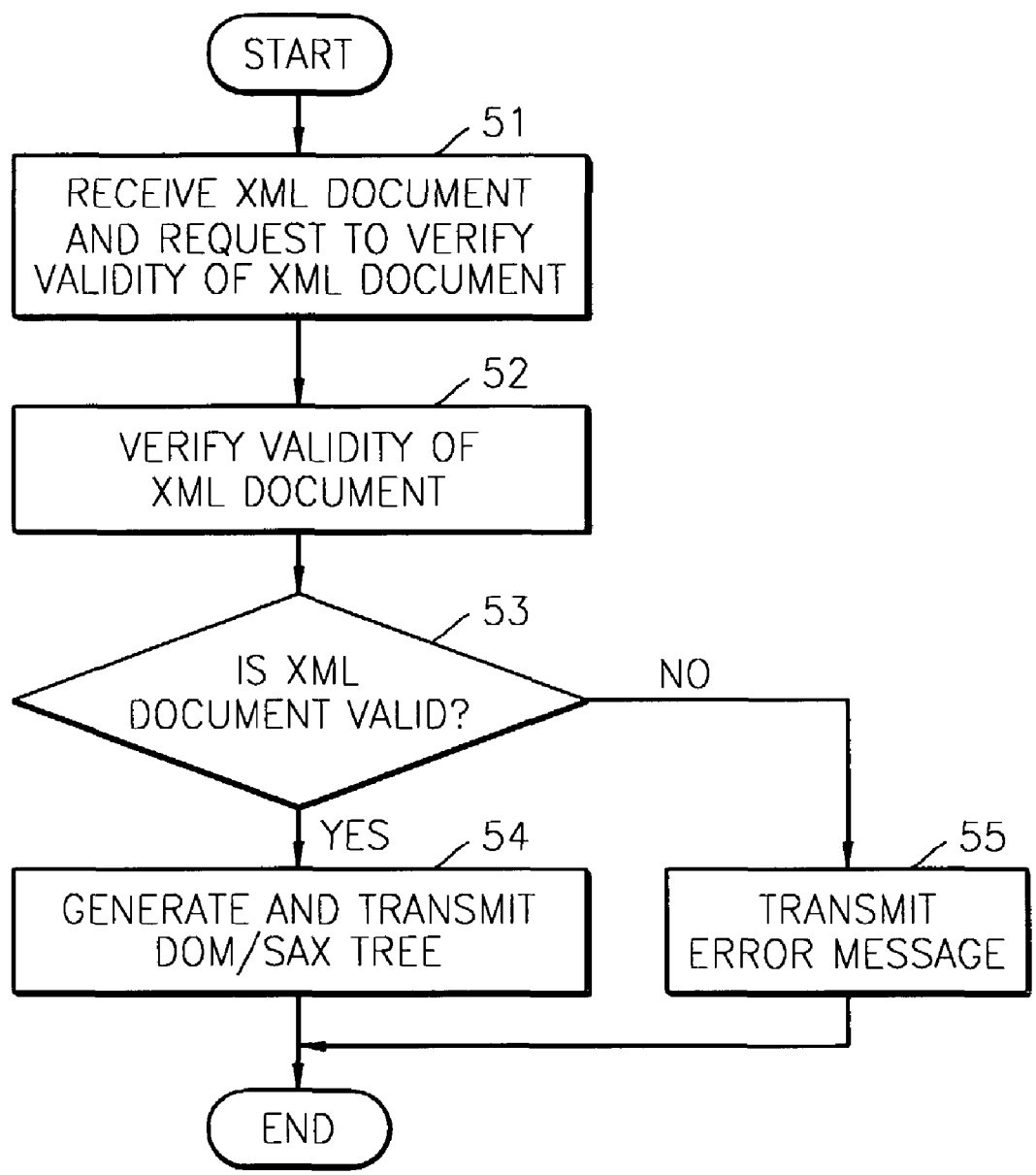
FIG. 5 is a flowchart explaining a method for parsing an XML document by using a method for verifying the validity of an XML document employing the external XML validator according to an embodiment of the present invention.

FIG. 5 is a flowchart for explaining a method for verifying the validity of an XML document and a method for parsing an XML document by using the validity method.

In step 51, an XML document is received and the verification of the validity of the XML document is requested. In step 52, a schema/DTD corresponding to the XML document is received, the XML document is applied to the schema/DTD to verify the validity of the XML document, and the validity result of the XML document is transmitted. If in step 53, it is determined that the XML document is valid, a DOM/SAX tree is created from the XML document and transmitted in step 54. If in step 53, it is determined that the XML document is not valid, an error message is transmitted in step 55.

As described above, according to the present invention, the use of resources of an embedded device (e.g., a PDA, a portable phone, a hand-held device or the like) having a relatively low-performance and a small memory can be minimized when calling an external XML validator. Thus, am external XML validator can be called to transmit an accurate XML document to an XML application without extending an existing parser. Also, the external XML validator can validate a pre-set schema/DTD and an after-established schema/DTD at the same time to correct errors (errors in an XML document due to changes in an external schema/DTD) in the XML document due to the version of the schema/DTD. As a result, errors in an existing validated XML document can be prevented.

The above-described embodiments of the present invention can be written as a program which can be executed in a computer or data-processor, and can be realized in a general-purpose digital computer by using a computer-readable recording medium. The computer-readable recording medium includes magnetic storage media (e.g., ROMs, floppy discs, hard discs, etc.), optical readers (e.g., CD-ROMs, DVDs, and the like), control cards, firmware, circuit boards, hardware and carrier wave (e.g., the transmission over the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A computer implemented XML parser for calling an external XML validator, said XML parser comprising:
    an XML receiver configured to receive an XML document from an XML application;
    an external XML validator caller configured to request the external XML validator to verify the validity of the XML document and to receive an answer to the request, wherein the external XML validator receives a schema or a DTD corresponding to the XML document in response to the request; and
    a DOM/SAX tree generator configured to generate, if said external XML validator caller receives an answer indicating that the XML document is valid, a DOM/SAX tree from the XML document and to transmit the DOM/SAX tree to the XML application.

2. The XML parser of claim 1, said DOM/SAX tree generator being further configured to transmit, if said external XML validator caller receives an answer that the XML document is not valid, an error message to the XML application.

3. The XML parser of claim 1, said external XML validator caller being further configured to find a location of the external XML validator based on data contained in the XML document, to request said external XML validator to verify the validity of the XML document, and to receive an answer to the request.

4. The XML parser of claim 1, said external XML validator caller being further configured to transmit a version of an operating system of a device having said XML parser and the XML document to said external XML validator, to request said external XML validator to verify the validity of the XML document, and to receive an answer to the request.

5. An external computer implemented XML validator configured to verify the validity of an XML document in an XML parser, said external XML validator comprising:
    a schema/DTD receiver configured to verify, upon request, the validity of the XML document from the XML parser and to receive, in response to the request, a schema or a DTD corresponding to the XML document from a schema/DTD database;
    an XML validator configured to apply the XML document to the received schema or the DTD to verify the validity of the XML document; and
    an XML validity result transmitter configured to transmit the validity result of the XML document to the XML parser.

6. The external XML validator of claim 5, said schema/DTD receiver being further configured to receive from the XML parser a version of an operating system of a device having the XML parser and the XML document, to receive a request to verify the validity of the XML document, and, if the operating system requires said external XML validator, to receive the schema or the DTD corresponding to the XML document from the schema/DTD database.

7. The external XML validator of claim 5, wherein if the schema/DTD receiver receives the request to verify the validity of the XML document from the XML parser, said schema/DTD receiver finds the location of the schema/DTD database from the XML document and receives the schema or the DTD corresponding to the XML document from the schema/DTD database.

8. A computer implemented XML parser and external XML validator system configured to parse and to verify an XML document, said system comprising:
    an XML parser configured to receive the XML document from an XML application, to request an external XML validator to verify the validity of the XML document, to generate, upon receiving an answer that the XML document is valid, a DOM/SAX tree from the XML document, and to transmit the DOM/SAX tree to the XML application; and
    the external XML validator configured to receive a request for verifying the validity of the XML document from said XML parser, to receive, in response to the request, a schema or a DTD corresponding to the XML document from a schema/DTD database, to apply the XML document to the schema or the DTD, to verify the validity of the XML document, and to transmit the validity result of the XML document to said XML parser.

9. The system of claim 8, said XML parser being further configured to receive the XML document from the XML application, to request the external XML validator to verify the validity of the XML document, and, if an answer to the request indicates that the XML document is not valid, to transmit an error message to the XML application.

10. An XML document parsing method calling an external XML validator, the method comprising:
    (a) receiving an XML document from an XML application;
    (b) requesting verification of the validity of the XML document from the external XML validator, and in response to receiving the verification request the external validator receives at the external validator a schema or a DTD corresponding to the XML document, and receiving an answer to the request; and
    (c) generating, if the received answer to the request indicates that the XML document is valid, a DOM/SAX tree from the XML document, and transmitting the DOM/SAX tree to the XML application.

11. The method of claim 10, wherein if the received answer in operation (b) to the request indicates that the XML document is not valid, an error message is transmitted.

12. The method of claim 10, wherein in operation (b), the location of the external XML validator is found from the XML document, a request to verify the validity of the XML document is transmitted to the external XML validator, and an answer to the request is received.

13. The method of claim 10, wherein in operation (b), a version of the operating system of an XML parser and the XML document are transmitted to the external XML validator, the verification of the validity of the XML document is requested, and an answer to the request is received.

14. An XML document verification method calling an external XML validator, the method comprising:
   (a) receiving, at the external XML validator, upon requesting verification of the validity of an XML document, a schema or a DTD corresponding to the XML document;
   (b) applying the XML document to the schema or the DTD to verify the validity of the XML document; and
   (c) transmitting the validity result of the XML document.

15. The method of claim 14, wherein in operation (a), a version of the XML document and an operating system of an XML parser are received, the verification of the validity of the XML document is requested, and if the operating system requires an external XML validator, the schema or the DTD is received from a schema/DTD database.

16. The method of claim 14, wherein in operation (a), if the verification of the validity of the XML document is requested, the location of the schema/DTD database is found from the XML document, and the schema or the DTD corresponding to the XML document is received from the schema/DTD database.

17. An XML document parsing and verifying method comprising:
   (a) receiving an XML document at a first device and requesting a second device to verify the validity of the XML document;
   (b) receiving, at the second device, upon requesting verification of the validity of the XML document, a schema or a DTD corresponding to the XML document, applying the XML document to the schema or the DTD to verify the validity of the XML document, and transmitting an answer to the first device in answer to the request; and
   (c) receiving the answer to the request, and if the answer indicates that the XML document is valid, generating a DOM/SAX tree from the XML document, and transmitting the DOM/SAX tree.

18. The method of claim 17, wherein if the received answer in operation (b) to the request indicates that the XML document is not valid, an error message is transmitted.

19. A non-transitory data processor-readable recording medium incorporating instructions configured to perform an XML document parsing method calling an external XML validator, the method comprising:
   (a) receiving an XML document from an XML application;
   (b) requesting verification of the validity of the XML document from the external XML validator, and in response to receiving the verification request the external validator receives at the external validator a schema or a DTD corresponding to the XML document, and receiving an answer to the request; and
   (c) generating, if the received answer to the request indicates that the XML document is valid, a DOM/SAX tree from the XML document, and transmitting the DOM/SAX tree to the XML application.

20. The medium of claim 19, the method further comprising transmitting an error message if the received answer in operation (c) to the request indicates that the XML document is not valid.

21. The medium of claim 19, the method further comprising transmitting to the external XML validator a request to verify the validity of the XML document, wherein the location of the external XML validator is found from the XML document, and an answer to the request is received.

22. The medium of claim 19, the method further comprising transmitting in operation (b) to the external XML validator a version of the operating system of an XML parser and the XML document, wherein the verification of the validity of the XML document is requested, and an answer to the request is received.

23. A non-transitory data processor-readable recording medium incorporating instructions configured to perform an XML document verification method calling an external XML validator, the method comprising:
   (a) receiving, at the external XML validator, upon requesting verification of the validity of an XML document, a schema or a DTD corresponding to the XML document;
   (b) applying the XML document to the schema or the DTD to verify the validity of the XML document; and
   (c) transmitting the validity result of the XML document.

24. The medium of claim 23, the method further comprising receiving, in operation (a), a version of the XML document and an operating system of an XML parser, requesting the verification of the validity of the XML document, and if the operating system requires an external XML validator, receiving from a schema/DTD database the schema or the DTD.

25. The medium of claim 23, the method further comprising finding, in operation (a), if the verification of the validity of the XML document is requested, the location of the schema/DTD database from the XML document, and receiving the schema or the DTD corresponding to the XML document from the schema/DTD database.

26. A non-transitory data processor-readable recording medium incorporating instructions configured to perform an XML document parsing and verifying method comprising:
   (a) receiving an XML document at a first device and requesting a second device to verify the validity of the XML document;
   (b) receiving, at the second device, upon requesting verification of the validity of the XML document, a schema or a DTD corresponding to the XML document, applying the XML document to the schema or the DTD to verify the validity of the XML document, and transmitting an answer to the first device in answer to the request; and
   (c) receiving the answer to the request, and if the answer indicates that the XML document is valid, generating a DOM/SAX tree from the XML document, and transmitting the DOM/SAX tree.

27. The medium of claim 26, the method further comprising transmitting an error message, if the received answer to the request in operation (a) indicates that the XML document is not valid.

* * * * *